United States Patent
Sekine et al.

(10) Patent No.: US 8,224,685 B2
(45) Date of Patent: Jul. 17, 2012

(54) APPARATUS AND METHOD FOR ANALYZING PERSONAL BEHAVIOR

(75) Inventors: Naoki Sekine, Toyko (JP); Tomonori Ikumi, Shizuoka (JP); Takashi Koiso, Kanagawa (JP); Masami Takahata, Tokyo (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 465 days.

(21) Appl. No.: 12/485,845

(22) Filed: Jun. 16, 2009

(65) Prior Publication Data

US 2009/0319340 A1     Dec. 24, 2009

(30) Foreign Application Priority Data

Jun. 18, 2008  (JP) ................. 2008-159400

(51) Int. Cl.
*G06F 9/40* (2006.01)
(52) U.S. Cl. ...................................... 705/7.29
(58) Field of Classification Search ............. 705/7.29
See application file for complete search history.

(56) References Cited

U.S. PATENT DOCUMENTS

| | | | | |
|---|---|---|---|---|
| 7,212,650 | B2 * | 5/2007 | Sumi ........................... | 382/103 |
| 7,924,311 | B2 * | 4/2011 | Yoshida et al. .............. | 348/159 |
| 2003/0009364 | A1 * | 1/2003 | Miyoshi et al. .............. | 705/7 |
| 2006/0200378 | A1 * | 9/2006 | Sorensen ...................... | 705/10 |

FOREIGN PATENT DOCUMENTS

| | | |
|---|---|---|
| JP | 2003-006414 | 1/2003 |
| JP | 2006-350751 | 12/2006 |

\* cited by examiner

*Primary Examiner* — Romain Jeanty
(74) *Attorney, Agent, or Firm* — Patterson & Sheridan, LLP

(57) ABSTRACT

The invention provides a personal behavior analysis apparatus capable of statistically analyzing a personal behavior. To analyze personal behaviors, a population data file is provided that stores flow-line data for individual persons as a population acquired by tracking the behaviors of persons within a monitored area. After input of a condition for narrowing down the flow-line data as analysis objects is accepted via a condition input section, the population data file is searched based on the condition and flow-line data meeting the condition is acquired. The acquired flow-line data is stored in a subpopulation data file as a subpopulation. A control section of the apparatus calculates statistics values related to personal behavior analysis using the flow-line data stored in the subpopulation data file and displays them on a display section.

14 Claims, 13 Drawing Sheets

Fig.6

| Area ID | Area name | Coordinates of upper-left corner | Coordinates of lower-right corner |
|---|---|---|---|
|  |  |  |  |
|  |  |  |  |
|  |  |  |  |
| ⋮ | ⋮ | ⋮ | ⋮ |

| Flow-line ID | Transaction ID | Transaction time |
|---|---|---|
|  |  |  |
|  |  |  |
|  |  |  |
| ⋮ | ⋮ | ⋮ |

| Item ID | Item name | Subpopulation statistics value | Population statistics value |
|---|---|---|---|
|  |  |  |  |
|  |  |  |  |
|  |  |  |  |
| ⋮ | ⋮ | ⋮ | ⋮ |

~53

| | |
|---|---|
| ID 20070210_200126002buy | ◀ ▶ |

| Number of purchases 1/1 | Number of purchase points 1/8 |
|---|---|
| Attributes | Value |
| Cashier No. | |
| Transaction time/date | |
| Transaction serial No. | |
| Total amount | |
| Coupon | |
| Total number of purchase points | |
| Customer base | |
| Category | |
| Specification type | |
| PLU (Price-Look-Up) | |
| Amount | |
| Number of points | |
| Proper code | |
| Major classification Code | |
| Medium classification Code | |
| Common minor classification Code | |
| Minor classification Code | |
| FF classification | |
| Display rack | |
| Rack | |
| Row code | |
| Face quantity | |
| Article name | |
| Name of medium classification name | |
| Name of common minor classification | |
| Name of minor classification | |
| Name of display rack | |
| | |
| | |
| | |
| | |

Fig.16

APPARATUS AND METHOD FOR ANALYZING PERSONAL BEHAVIOR

CROSS REFERENCE TO RELATED APPLICATION

This application is based upon and claims the benefit of priority from prior Japanese Patent Application No. 2008-159400, filed Jun. 18, 2008, the entire content of which is incorporated herein by reference.

BACKGROUND OF THE INVENTION

1. Field of the Invention

The present invention relates to an apparatus and method for analyzing a personal behavior. The invention particularly relates to a personal behavior analysis apparatus for analyzing the behavior of a customer entered a store such as a convenience store or supermarket, and a method for analyzing a personal behavior with a program that enables a computer to function as the analysis apparatus.

2. Description of the Related Art

Japanese laid-open patent application publication No. 2006-350751 discloses a sales analysis apparatus that uses a technique of tracking a personal flow-line as a system for analyzing a behavior of a customer entered a store. This sales analysis apparatus comprises a picture database storing pictures shot by cameras installed within a store, each picture being correlated with time information; a sales information database storing sales information including purchased commodities input from a sales information input device, each piece of the sales information correlated with a purchase time; a flow-line conversion processing section that first acquires a picture stored in the picture database performing image processing to the picture to extract a person and track the person extracted, and generates flow-line data including coordinates indicative of person's position and person's ID information correlated with the time information; and a flow-line database storing the flow-line data generated by the flow-line conversion processing section. The sales analysis apparatus is configured to extract a target person from the sales information database by designating the sales information and specify flow-line data in the flow-line database based on the purchase time of the target person and display the flow-line data.

However, although customer behavior analyzing systems in the prior art including the above-described sales analysis apparatus can analyze a flow-line of an optionally selected customer as a target person, it cannot perform statistical analysis focusing on what characteristics such a target person has in a subpopulation.

SUMMARY OF THE INVENTION

According to one embodiment of the present invention, there is provided a personal behavior analysis apparatus capable of statistically analyzing personal behaviors.

The personal behavior analysis apparatus according to the present invention comprises: a population storage section storing flow-line data of persons as a statistical population (hereinafter "population") each flow-line data being separately acquired by tracking a behavior of each person within a monitored area; a condition input section accepting input of condition for narrowing down the flow-line data as analysis objects from the data as a population stored in the population storage section; searching means for searching the population storage section based on the condition that is input through the condition input section to acquire flow-line data meeting the condition; a subpopulation storage section storing the flow-line data as a subpopulation acquired by the searching means; subpopulation statistics-value computing means for computing a statistics-value relating to personal behavior analysis using the flow-line data stored in the subpopulation storage section; and statistics-value display means for displaying the subpopulation statistics-value computed by the subpopulation statistics-value computing means.

According to another embodiment of the present invention, there is provided a method of analyzing personal behaviors capable of performing statistical analysis of customers' behaviors using a program installed in the computer. The personal behavior analysis program enables a computer having an input section, a display section, and a storage section to fulfill a population storage function of storing flow-line data of individual persons as a population each data being separately acquired by tracking a behavior of each person within a monitored area, a condition input function of accepting input of condition through the input section for narrowing down the flow-line data as analysis objects from the data stored as a population in the storage section, a searching function of searching the data as a population stored in the storage section based on the condition that is input through the input section to acquire a flow-line data that meets the condition, a subpopulation storage function of storing as a subpopulation the flow-line data acquired by the searching function, a subpopulation statistics-value computing function of computing a statistics-value relating to personal behavior analysis using the flow-line data stored in the storage section as a subpopulation, and a statistics-value display function of displaying the subpopulation statistics-value computed by the subpopulation statistics-value computing function.

BRIEF DESCRIPTION OF THE DRAWINGS

This and other objects and advantages of this invention will become apparent and more readily appreciated from the following detailed description of the presently preferred exemplary embodiments of the invention taken in conjunction with the accompanying drawings wherein:

FIG. 6 is a configuration diagram of data in a store area division table contained in the personal behavior analysis apparatus according to the embodiment of the present invention;

FIG. 7 is a configuration diagram of data in a flow-line/transaction link table contained in the personal behavior analysis apparatus according to the embodiment of the present invention;

FIG. 8 is a configuration diagram of data in a statistics information table contained in the personal behavior analysis apparatus according to the embodiment of the present invention;

FIG. 16 is a plan view showing an example of a purchase information display section of the personal behavior analysis apparatus;

DETAILED DESCRIPTION OF THE INVENTION

The best mode for carrying out the present invention will be described below in reference to the accompanying drawings. This embodiment is applied to a personal behavior analysis apparatus, operated by a computer, which analyzes the behavior of a customer moving around in a store-premise, while illustrating by an example a premise of a convenience store as a monitored area.

Figure 1:
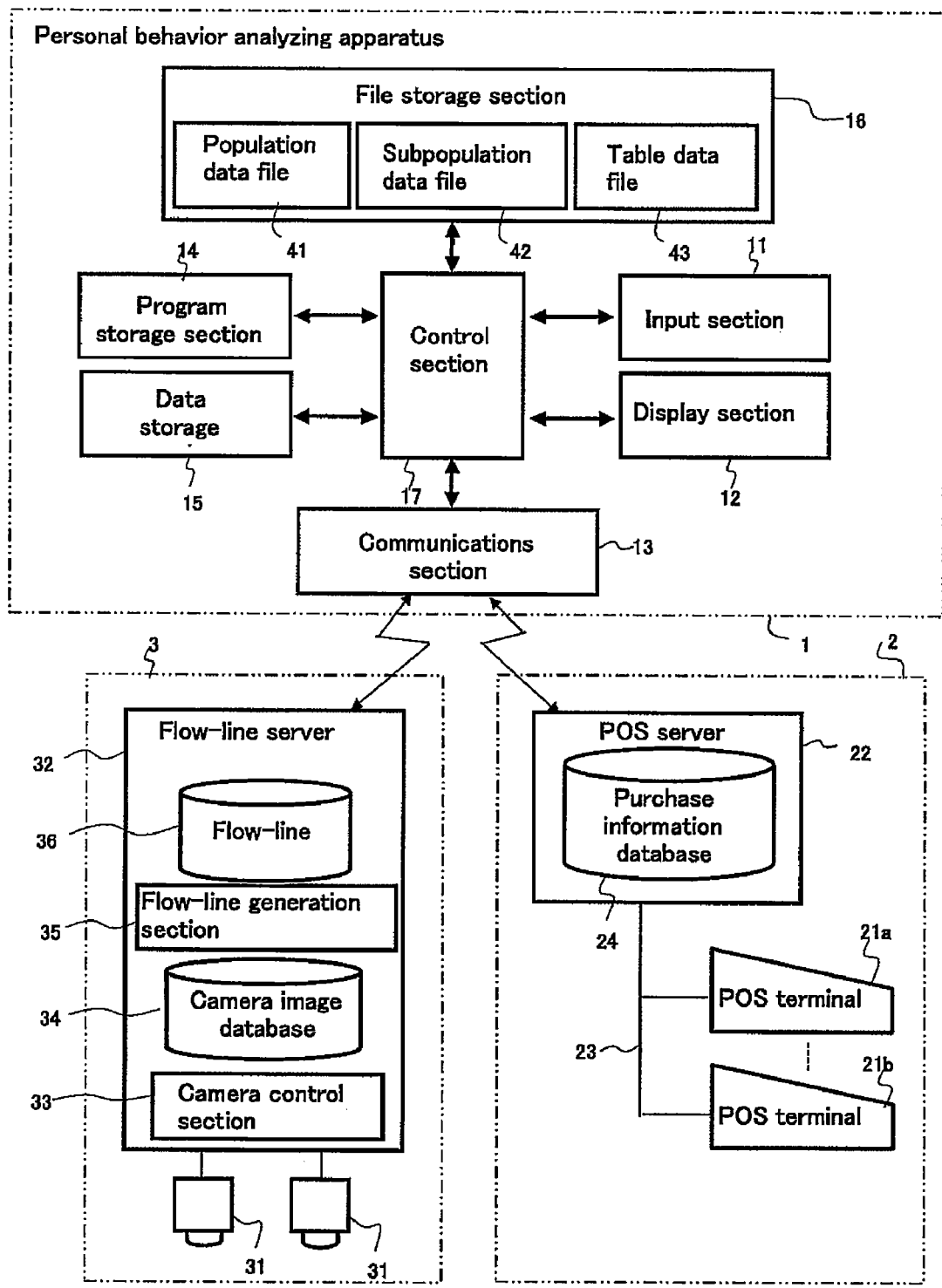
FIG. 1 is a system configuration diagram according to an embodiment of the present invention.

FIG. 1 is a system configuration diagram according to the embodiment. The system is comprised of a personal behavior analysis apparatus 1, and computer systems 2 and 3 that respectively execute sales management and flow-line management.

The computer system that executes sales management, a so-called sales management system 2, is composed of more than one (two sets in FIG. 1) POS terminal 21*a*, 21*b*, and a POS server 22 operating as their superior machine. The POS server 22 and each of the POS terminals 21*a* and 21*b* are interconnected via a communication line 23 such as a local area network (LAN). The sales management system 2 in such a configuration is generally called a POS system.

Figure 2:
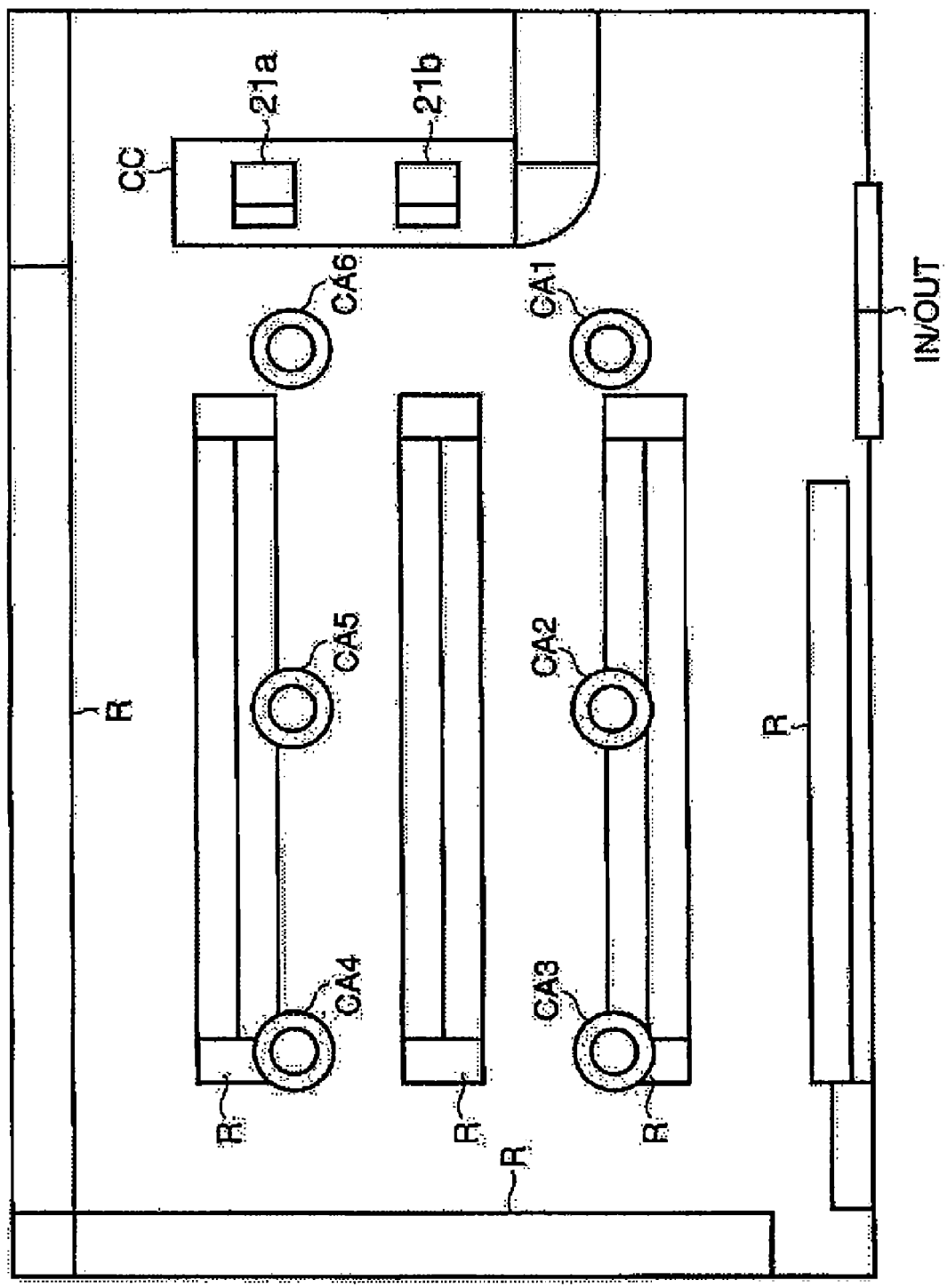
FIG. 2 is a plan view showing a store-premise sales area in a store to which the above embodiment of the present invention is applied.

The each of POS terminal 21*a* and POS terminal 21*b*, which processes sales data of commodities purchased by customers and settles commercial transactions with the customers, is installed at a checkout counter CC as illustrated in the plan view of a sales area in the store-premise in FIG. 2. A customer entered a store through an entrance IN/OUT, freely walks around the sales area where commodity display racks R are installed. Finding a commodity to be purchased, the customer brings it to the checkout counter CC. A store clerk then registers sales data of the commodity that the customer purchases into the POS terminal 21*a* or POS terminal 21*b* to settle the commercial transaction. The customer having finished the commercial transaction goes out the store through the entrance IN/OUT.

Each time such a commercial transaction is settled, each of the POS terminals 21*a* and 21*b* generates purchase information representative of the contents of the commercial transaction, so-called transaction data. The transaction data includes specific data of articles purchased/sold in the commercial transaction, such as article code, article name, category code, unit price, purchase points and a purchase amount or total amount, an amount received, and a change. Also included in the transaction data are terminal number, transaction serial number, ID of a clerk-in-charge, transaction date/time, and others.

"Terminal number" is information for identifying the POS terminal 21*a* or POS terminal 21*b* that has settled the commercial transaction. "Transaction serial number" is a number that is incremented each time a commercial transaction is settled by POS terminal 21*a* or POS terminal 21*b*. "ID of a Clerk-in-charge" is a code that identifies a cashier who has settled a commercial transaction.

"Transaction date/time" indicates the date/time when a commercial transaction is initiated. Each of POS terminal 21*a* and POS terminal 21*b* incorporates a clock IC. A control section of each of POS terminal 21*a* and POS terminal 21*b* acquires a date and a time (year, month, date, minute, second), as the date/time of a commercial transaction, which clocks when commodity data of one article of a customer is input.

The POS server 22 controls a commodity database that contains commodity information such as article code, article name, category code, and unit price of each article sold in the store-premise. Each of POS terminal 21*a* and POS terminal 21*b* generates transaction data based on the commodity information contained in this commodity database.

The POS server 22 also has a purchase information database 24. The transaction data generated in each of POS terminal 21*a* and POS terminal 21*b* is transmitted to the POS server 22 through the communication line 23 and stored in the purchase information database 24.

Figure 3:
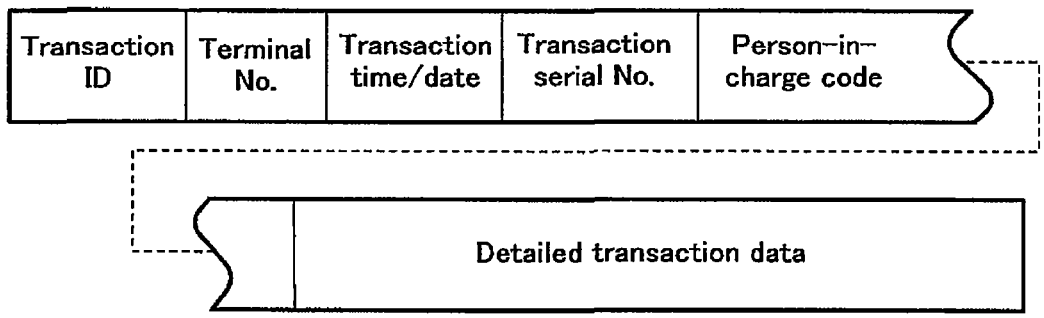
FIG. 3 is a configuration diagram of data stored in a purchase information database according to the embodiment of the present invention.

The configuration of the transaction data stored in the purchase information database 24 is illustrated in the diagram of FIG. 3. As shown in FIG. 3, the transaction data, which is comprised of a terminal number, transaction date/time, transaction serial number, ID of a clerk-in-charge, and specific data of commercial transaction, etc., is stored in the purchase information database 24 being correlated with a transaction ID. The transaction ID is a unique data generated upon each receipt of transaction data. The transaction data is individually identified by this transaction ID.

A computer system executing the management of flow-lines, a so-called flow-line management system 3, is composed of a plurality of cameras 31 and a flow-line server 32.

Each of the camera 31 is a wide-angle lens camera such as one using a fish-eye lens or one incorporating an omnidirectional mirror. More than one of the camera 31 are used to track a trajectory of a customer who moves in a sales area, i.e., a personal flow-line by means of the voxel carving method. The voxel carving method is a method that computes a coordinate value of, for example, the head portion of a customer from positions of the head in the pictures shot from several directions within three-dimensional coordination systems appropriately installed in an air space of the store-premise.

In the plan view of a sales area of the store-premise in FIG. 2, the respective cameras 31 are installed on the ceiling of the sales area at a predetermined space between them, as illustrated by the locations of CA1 to CA6. The head portion of a customer who moves around in the sales area is shot from these installation positions of the cameras. The installation positions of the cameras 31 are appropriately determined by the users, consulting a store layout drawing and actually trying to tentatively install a camera within the store-premise while considering the affection of screening by fixtures and furniture and POSs within the store-premise so that the whole sales area can be covered for shooting with the plurality of cameras. To raise the accuracy of the position detection using the voxel carving method, it is preferable to use at least three cameras to cover the overall area of the store for the shooting. Thus, the behavior of a person moving in the area to be monitored, i.e., the sales area can be tracked by the cameras 31 installed in this way.

The flow-line server 32, comprising a camera control section 33, controls operations of shooting of each camera 31. Each camera 31 reiterates an operation of shooting at a predetermined interval (e.g., 1/15 second) by the control of the camera control section 33 and transmits the shot images (frame images) to the flow-line server 32. The frame image data shot by each camera 31 is sequentially stored in a camera image database 34.

Figure 4:
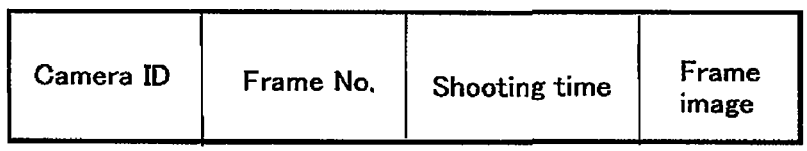
FIG. 4 is a configuration diagram of data stored in a camera image database according to the embodiment of the present invention.

FIG. 4 shows the configuration of the frame image data stored in the camera image database 34. As illustrated, the frame image data is correlated with a camera ID, a frame number, and a shooting time, and stored in the camera image database 34. The camera ID is an ID code of a camera that has shot a relevant image data. Each camera is respectively provided with a unique camera ID in advance. The frame number is a serial number that is incremented from "1, " each time when each camera shoots a frame image. The control of the camera control section is made so that the frame number of each camera 31 is synchronized. The shooting date/time indicates a date/time (year/month/day/minute/second) when a relevant image data was shot.

The flow-line server 32, comprising a flow-line generation section 35, generates a flow-line data of a person (customer). That is, the flow-line server 32 generates flow data by performing image processing for image data shot by each camera 31 to extract a moving object, then recognizing this moving object as a customer, and tracking his/her behavior.

In the current image processing technology, it is extremely difficult to track a behavior of a customer within the overall store-premise as one continuous flow-line, even if the overall area of the store-premise is shot by the cameras 31 without a trapping corner. Assume a case in which, for example, a flow-line is intermittent, or switched over to another flow-line. The flow-line server 32 has a function of connecting a plurality of intermittent flow-lines of a same customer together into one flow-line from the time of store entering to the time of exiting by, for example, manual operation of the operator. In this way, the flow-line data generated for each customer from the store entering to the exiting is sequentially stored in the flow-line database 36.

Figure 5:
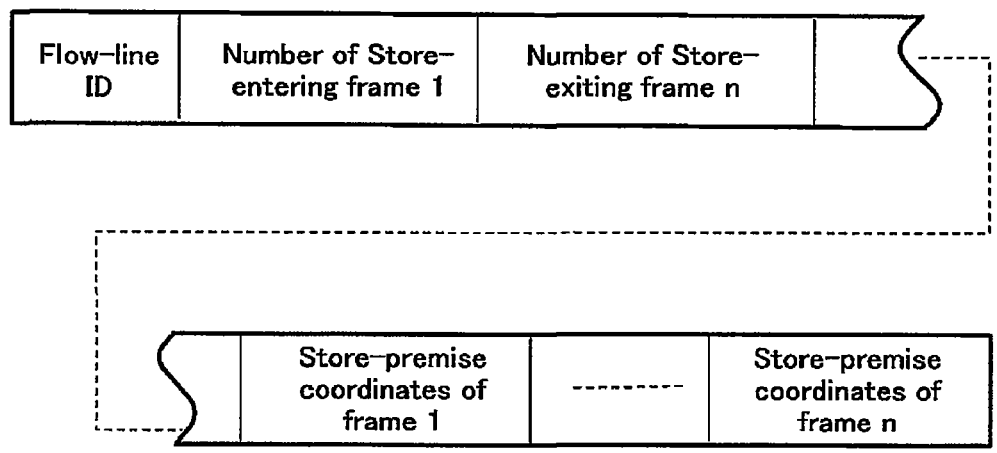
FIG. 5 is a configuration diagram of data stored in a flow-line database according to the embodiment of the present invention.

FIG. 5 is a configuration diagram of the flow-line data stored in the flow-line database 36. As illustrated therein, the flow-line data is stored in the flow-line database 36 in correlation with a flow-line ID. The flow-line ID is flow-line identification information for individually identifying a relevant flow-line data. Each time when generating the data from store entering to exiting of a customer, the flow-line server 32 stores the flow-line data attaching a unique flow-line ID to it in the flow-line database 36.

The flow-line data is composed of a frame number of store-entering frame "1", a frame number of exiting-store frame "n," ("n" is an integer greater than 1) and store-premise coordinate data for each frame from the store-entering frame "1" to the exiting-store frame "n." Store-entering frame number "1" indicates a frame number of a frame image acquired when a customer of a relevant flow-line data is first detected, and store-exiting frame number "N" indicates a frame number of a frame image acquired when a customer of a relevant flow-line data is last detected. The store-premise coordinates in the order of the frame number specify positions of a relevant customer detected from frame images corresponding to the frame numbers in a three-dimensional world coordinate system (X, Y, H) . In the plan view of a store-premise sales area in the store in FIG. 2 in the present embodiment, the upper left corner is defined as an original point (0, 0) of the X axis and Y axis, and the floor plane as an original point of the H (height) axis.

The personal behavior analysis apparatus 1 comprises an input section 11, a display section 12, a communication section 13, a program storage section 14, a data storage section 15, a file storage section 16, and a control section 17. The input section 11 is composed of input devices such as a keyboard and mouse. The display section 12 is composed of display devices such as a liquid crystal display and CRT display. The input section and display section may be combined by using a display incorporating a touch panel.

The communication section 13 functions to interface the apparatus with the servers (POS server 22 and flow-line server 32) of the respective computer systems 2, 3. The program storage section 14 is composed of a Read Only Memory (ROM). The data storage section 15 is composed of a Random Access Memory (RAM). The file storage section 16 is composed of a recording medium such as a hard disk or magneto optical disk. The control section 17 is composed mainly of a Central Processing Unit (CPU). The thus configured personal behavior analysis apparatus 1 can be fulfilled by a computer device such as a personal computer.

Accessing the POS server 22 and flow-line server 32 through the communication section 13, the personal behavior analysis apparatus 1 can process at a high speed data of the databases (purchase information database 24, camera image database 34, and flow-line database 36) that are managed by the respective servers.

The personal behavior analysis apparatus 1 is provided with a population data file 41, a subpopulation data file 42, and a table data file 43. The data files 41 to 43 are formed in the file storage section 16.

The population data file 41 accumulates flow-line data for respective persons as a population each separately acquired by tracking a behavior of a person within the monitored area. The subpopulation data file 42 accumulates flow-line data as a subpopulation each extracted from the population as an object to be analyzed. The table data file 43 stores a store-premise division table 51, a flow-line/transaction link table 52, and a statistics information table 53.

Figure 9:
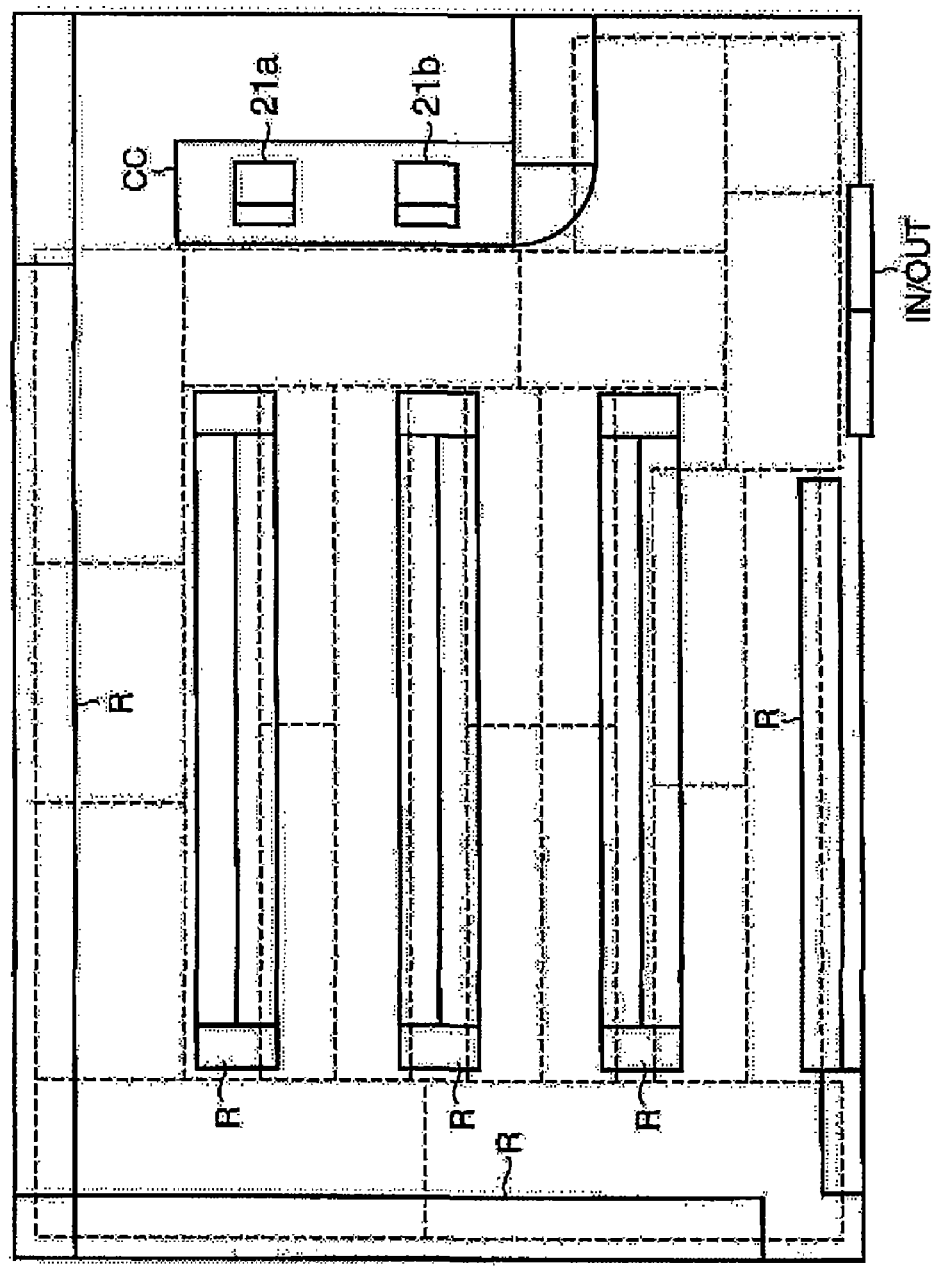
FIG. 9 is a plan view showing an example of dividing the store-premise sales area illustrated in FIG. 2.

FIG. 6 illustrates a data configuration of the store-premise division table 51. In this embodiment, the store sales area is divided into several rectangular plots, as indicated by dashed line in FIG. 9, to each of which a unique area ID is given. In the store-premise division table 51, for each area ID there are set up an area name given to a plot identified by a corresponding area ID, two-dimensional coordinates (X, Y) on the upper left corner in the corresponding plot, and two dimensional coordinates (X, Y) on the lower right corner in the corresponding plot. Herein, the store-premise division table 51 constitutes an area division information storage section that stores area division information for dividing the monitored area into multiple plots.

The sizes and the number of the plots within the store sales area are appropriately determined by a user of a relevant system referring to the drawing of a store and considering positions of commodities.

FIG. 7 shows the data configuration of a flow-line/transaction link table 52. The program storage section 14 in the personal behavior analysis apparatus 1 incorporates a flow-line/transaction link program. With this program initiated, the control section 17 executes the processing for correlating the transaction data stored in purchase information database 24 of the POS server 22 with the flow-line data stored in the flow-line database 36 of the flow-line server 32. This link processing is executed according to the processing procedure described below.

First, the control section 17 acquires each item of flow-line data accumulated in the flow-line database 36 and stores it in the data storage section 15. Then, the flow-line IDs of the respective items of the flow-line data are displayed as a list in a flow-line analysis screen 60 of the display section 12.

Figure 10:
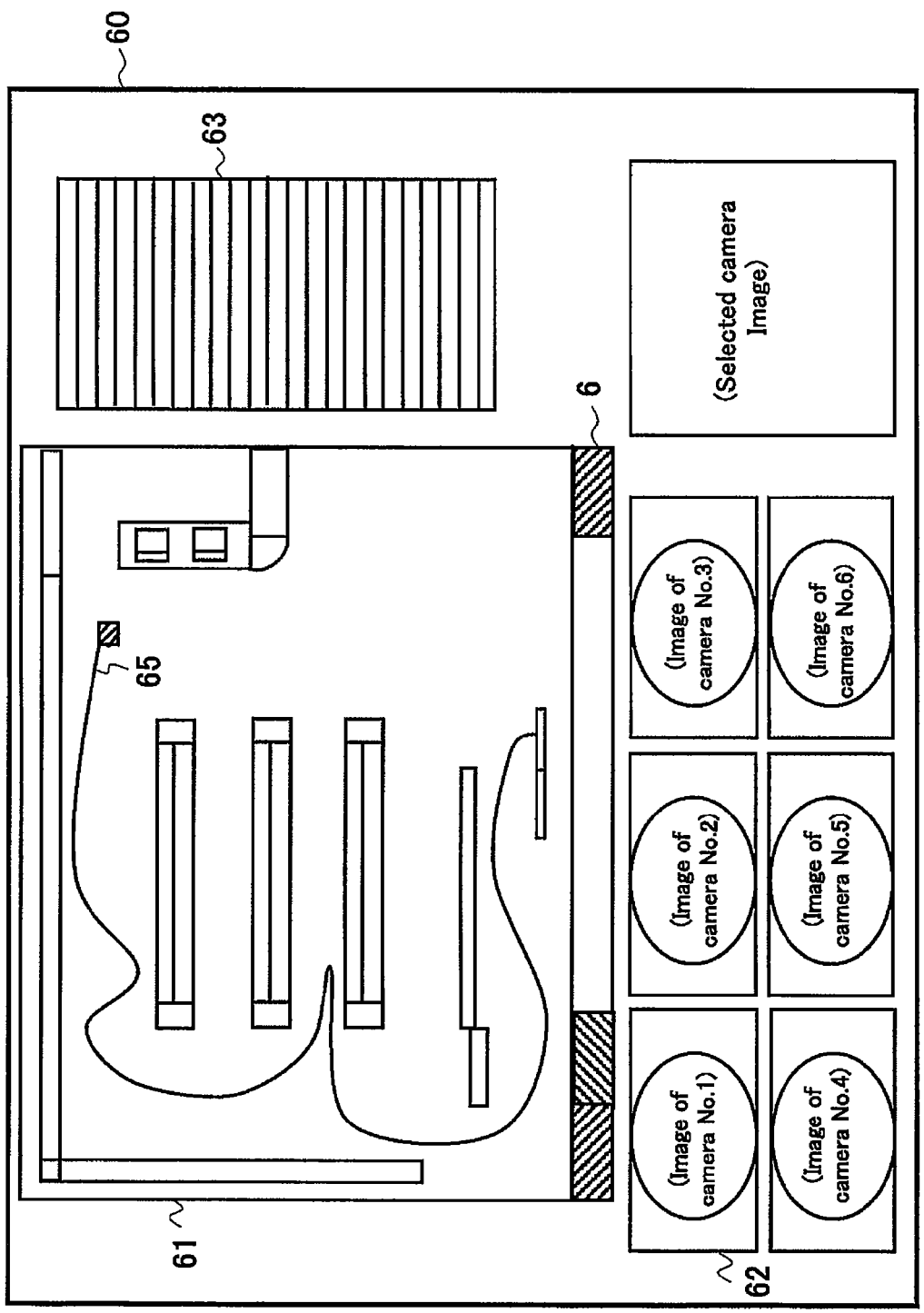
FIG. 10 is a plan view showing an example of a flow-line analysis screen displayed in a display section of the personal behavior analysis apparatus according to the embodiment of the present invention.

FIG. 10 shows an example of the flow-line analysis screen 60. As illustrated therein, the flow-line analysis screen 60 is divided into a flow-line display area 61, a camera image display area 62, and a list display area 63. The flow-line ID list is in the list display area 63. The user of the personal behavior analysis apparatus 1 selects a desired flow-line ID from the list. Then, a flow-line 65 specified by this flow-line ID is displayed in the flow-line display area 61.

In the flow-line display area 61, a map of the store sales area is displayed. In the flow-line display area 61, a scroll bar 64 is provided. The scroll bar 64 is synchronized with a shooting time of each camera 61. Upon sliding of the scroll bar 64 from the left to the right by the user facing the screen, the shooting time shifts. A flow-line 65 of a customer that is detected from a picture shot at that time by each camera 31 is displayed each being superimposed on the map.

In the camera image display area 62, a picture shot by each camera 31 at the time designated by the scroll bar 64 is displayed. As illustrated therein, pictures of six cameras 31 (CA1 to CA6) can be simultaneously displayed on the display. One picture selected from them can also be enlarged on the display.

The user tracks the flow-line 65 by operating the scroll bar 64, and determines if a relevant customer of the flow-line 65 has stepped in a checkout counter CC for checkout. If the customer did not step in the counter, then the user selects the subsequent flow-line ID to track it.

If the customer has stepped therein, the user confirms a time when a cashier registers a first article that the customer has purchased into the POS terminal from the camera picture displayed in sync with the flow-line 65. Then, the user inputs that time, a so-called transaction starting time, and the terminal number of a relevant POS terminal. A gender of the customer, and whether the customer is a group of more than one customer or a single customer are also input. For example, the apparatus is provided with a first terminal key for designating one POS terminal 21a and a second terminal key for designating the other POS terminal 21b in the input section 11, and the user presses an appropriate key at the time when a cashier has registered a first article that the customer purchased in the POS terminal. Similarly, there are also provided a gender key specifying a gender and a group/customer key that specifies whether the customer is alone or the customers are in a group, and appropriate keys are pressed when the gender and other have become known prior to the registration. Then, a shooting time of a frame image displayed in the camera image display area 62 when the terminal key has been pressed is correlated with that flow-line data as the transaction starting time together with terminal number, gender, group customer ID information, etc. The information (transaction time, terminal number, gender, group customer ID information, etc.) correlated with the flow-line data is incorporated into that flow-line data, and saved in the flow-line database 36.

In the similar manner to the above, the user performs such a correlation operation for the rest of the flow-line data displayed in the flow-line ID list with respect to transaction starting time, terminal number, gender, group customer ID information, etc.

After such transaction time, terminal number, gender, group customer ID information, etc. are correlated with respective items of the flow-line data, the personal behavior analysis apparatus 1 performs correlation between the transaction data and flow-line data. That is, the personal behavior analysis apparatus 1 first acquires one item of the transaction data from the purchase information database 24, and selects a flow-line data, from the flow-line database 36, with which a terminal number relating to this transaction data and a transaction starting time closest to the transaction date/time are correlated. Having selected the corresponding flow-line line data, the personal behavior analysis apparatus 1 then correlates the transaction ID and transaction time of the relevant transaction data with the flow-line ID of this flow-line data, and registers it in the flow-line/transaction link table 52.

The personal behavior analysis apparatus 1 reiterates the above processing each time of acquiring a transaction data from the purchase information database 24. In this way, all the flow-line data stored in the flow-line database 36 are correlated with the transaction data stored in the purchase information database 24. Herein, the flow-line/transaction link table 52 constitutes a correlating information storage section that stores correlation information that correlates purchase information of the respective customers within the monitored area with the flow-line data of the individual customers.

The transaction date/time of the transaction data may be a time when a commercial transaction ends, instead of the time when a commercial transaction starts. In this case, the user can operate the key confirming a time when a credit/cash key is operated from a camera image displayed in sync with a flow-line 65.

FIG. 8 shows a data configuration of the statistics information table 53. As can be seen, the statistics information table 53 provides, for each item of various statistical information relating to personal behavior analysis, areas for respectively storing a statistics-value of subpopulation data and a statistics-value of population data in association with a statistics item ID identifying a respective statistical item and a statistical item name. Herein, "statistical item" refers to cumulative total, maximum, minimum, average, variance, standard deviation.

Now let it be assumed that arbitrary data are respectively set up in the store-premise division table 51, flow-line/transaction link table 52, and statistics information table 53. The personal behavior analysis apparatus 1 is now enabled to execute the personal behavior analysis operation according to the personal behavior analysis program stored in the program storage section 14.

Figure 11:
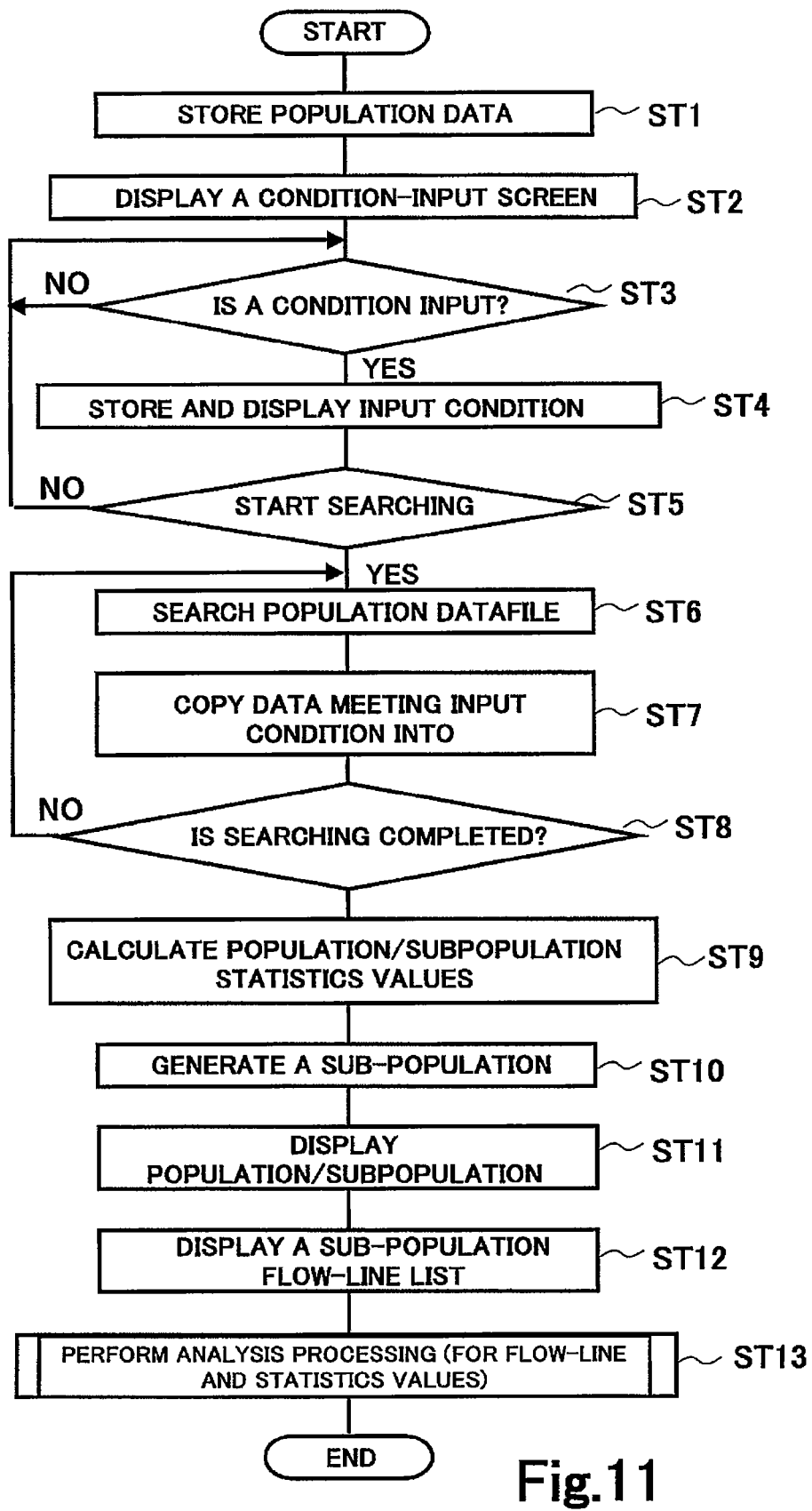
FIG. 11 is a flowchart showing a processing procedure of a control section executed according to a personal behavior analysis program in the personal behavior analysis apparatus according to the embodiment of the present invention.

Upon an instruction for starting the personal behavior analysis operation given through the input section 11, the personal behavior analysis apparatus 1 initiates the personal behavior analysis program. With the personal behavior analysis program initiated, the control section 17 executes the processing according to the procedure described in the flowchart of FIG. 11.

First, in step ST1, the control section 17 collects population data. That is, the control section 17 accesses the flow-line database 36 and collects all the flow-line data stored in the flow-line database 36. The flow-line data consists of flow-line ID, store-entering frame number, store-exiting frame number, store-premise coordinates of each frame, transaction starting time, terminal number, gender, customer group ID information. The collected flow-line data is stored in a population data file 41 as population data. Herein, the population data file 41 constitutes a population storage section that stores collective individual flow-line data as a population, each individual data being acquired by tracking a behavior of each person within the monitored area.

Figure 14:
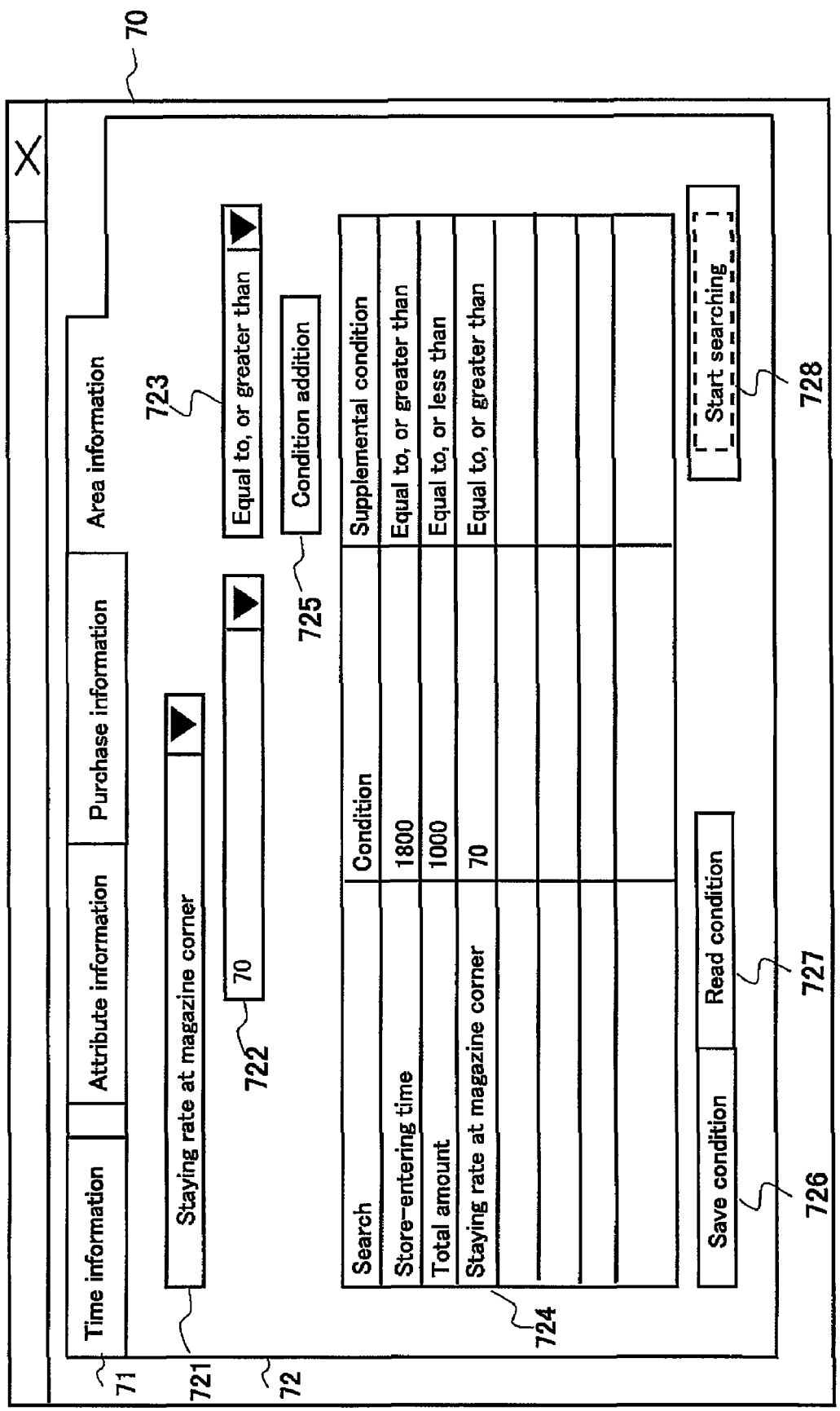
FIG. 14 is a plan view showing an example of a condition input section displayed in the display section of the personal behavior analysis apparatus according to the embodiment of the present invention.

In step ST2, the control section 17 then displays the condition input section 70 on the display section 12. FIG. 14 shows an example of the condition input section 70. As illustrated in FIG. 14, the condition input section 70 selectably provides a plurality of tabs 71 for items of time information, attribute information, purchase information, and area information. The section 70 displays an input panel 72 corresponding to one tab item selected from the tabs 71.

The input panel of each tab item has the same structure in which search item input column 721, search value input column 722, supplemental condition input column 723, input condition display table 724, condition adding button 725, condition save button 726, condition read button 727, and search start button 728 are provided.

In the search item input column 721, a group of search items attributed to a corresponding tab item are displayed on a pulldown menu. When the user selects a desired search item from the group of search items, that search item is accepted as one having been input. Groups of search items corresponding to the respective tab items are shown below:

Tab setting item "Time information": store-entering time, store-exiting time, transaction time, store-entering time zone, store-exiting time zone, transaction time zone, staying time, etc.

Tab setting item "Attribute information": the number of purchases, the number of scans, staying time, gender, etc.

Tab setting item "Purchase information": terminal number, transaction date/time, transaction serial number, sum total, total purchase points, customer base, article category code, articles shelf code, etc.

Tab setting item "Area information": entrance/exit, cashier, passage, magazine corner, beverage corner, lunchbox corner, magazine-corner staying ratio, beverage-corner staying ratio, lunchbox-corner staying ratio, etc. (stay ratio: a ratio of staying at a given corner=number of staying frames/total number of frames)

In the search value input column 722, search value candidates corresponding to a relative search item that is input in the search item input column 721 are shown on a pulldown menu. When the user selects a desired search value from these search value candidates, that selected search value is accepted as one having been input.

In the supplemental condition input column 723, a group of selective supplemental condition items (greater than, less than, equal to, etc.) corresponding to a relative search value that is input in the search value input column 722 are shown on a pulldown menu. When the user selects a desired supplemental condition item from the group of selective supplemental condition items, that supplemental condition item is accepted as one having been input.

When the user inputs desired search item, search value, and supplemental condition for the respective search item input column 721, search value input column 722, and supplemental condition input column 723, and presses the condition adding button 725, information items input in the respective input columns of 721-723 are displayed in the input condition display column 724 as the condition data. Subsequently, when the user presses the condition save button 726, the condition data displayed in the input condition display table 724 is stored in the data storage section 15. This condition data stored in the data storage section 15 is recalled by pressing the condition read button 727 and displayed again in the input condition display table 724.

That is, after the display section 12 displays the condition input section 70, the control section 17 waits for condition data being input through condition input section 70 in step ST3. If the condition data is input (yes in step ST3), the control section 17 displays in step ST4 that input condition data on the display section 12, and stores the data in the data storage section 15.

The control section 17 then waits for the search start button 728 being pressed in step ST5. Upon detecting the press of the search start button 728 through the input section 11, the control section 17 searches the population data file 41 according to the condition data input in step ST6. Each time that flow-line data meeting the input condition is acquired, that flow-line data is copied into the subpopulation data file 42 in step ST7. The control section 17 continues the search in step ST6 until the last data in the population data file 41 is reached. Upon completion of the search (Yes in step ST8), the control section 17 steps into the processing in steps ST9 and ST10.

Herein, the condition input section 70 accepts input of condition for narrowing down flow-line data as analysis objects from the population data as a population stored in the population storage section (population data file 41). The control section 17 constitutes a searching means for acquiring a flow-line data meeting such condition by searching the population storage section (population data file 41) according to the condition input through the condition input section 70 by the operation of step ST 5. The subpopulation data file 42 constitutes a subpopulation storage section for storing the flow-line data as a subpopulation acquired by the searching means.

In step ST9, the control section 17 calculates a subpopulation statistics-value and a population statistics-value for each statistical item that is set up in the statistics information table 53. The subpopulation statistics-value is calculated using flow-line data accumulated in the subpopulation data file 42. The population statistics-value is calculated using flow-line data accumulated in the population data file 41. In the case of "cumulative total" of the statistical total, the number of applicable flow-line data items among the data stored in respective data files is counted. For "minimum value," and "maximum value" of the statistical item, a maximum value or minimum value of applicable items is extracted from flow-line data stored in the respective data files. In the case of "average," "variance," and "standard deviation" of the statistical item, an average, variance, or standard deviation of applicable items are calculated among flow-line data stored in the respective data files. The respective calculated statistics quantities are stored in the statistics information table 53.

In step ST10, the control section 17 generates a flow-line list from the respective flow-line data stored in the subpopulation data file 42. The flow-line list includes at least a flow-line ID as flow-line identification information for individually identifying each flow-line data.

Herein, the control section 17 constitutes, by the operation in step ST9, a subpopulation statistics-value calculating means for calculating a statistics-value relating to personal behavior analysis using the flow-line data stored in the subpopulation storage section (subpopulation data file 42), and a population statistics-value calculating means for calculating a like statistics-value using the flow-line data stored in the population storage section (population data file 41). The control section 17 also constitutes, by the operation in step ST10, a list generating means for generating a list of flow-line identification information for identifying each flow-line data stored in the subpopulation storage section (subpopulation data file 42).

Upon completion of the processing of steps ST9 and ST10, the control section 17 displays the statistics information in step ST11 and the flow-line list in step ST12 on the display section 12.

Figure 15:
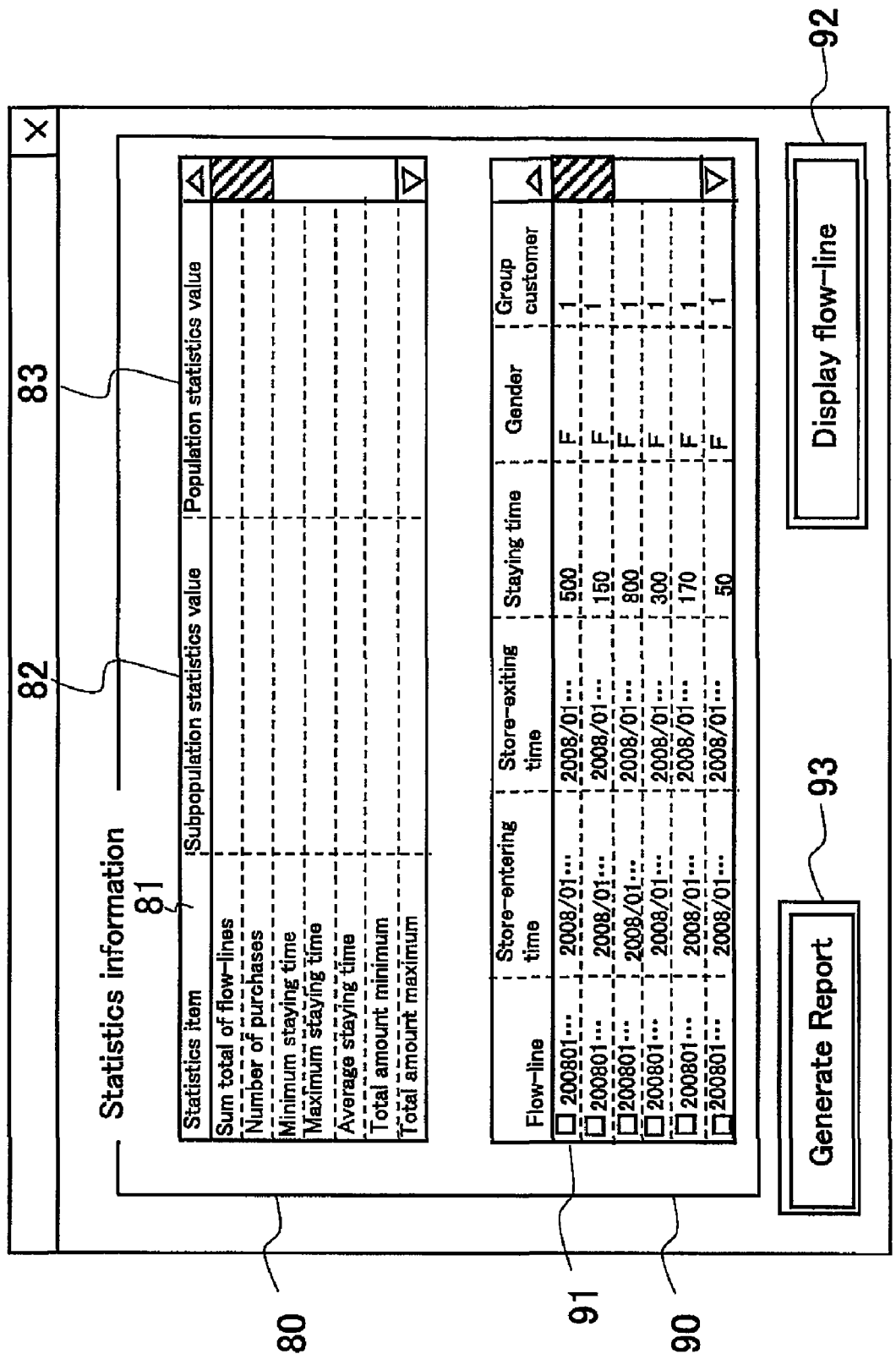
FIG. 15 is a plan view showing examples of a statistics information display section and a flow-line list display section displayed in the display section of the personal behavior analysis apparatus according to the embodiment of the present invention.

FIG. 15 shows a display example of the statistics information and flow-line list. The statistics information is shown in a statistics information display section 80. In the statistics information display section 80, the subpopulation statistics-value and population statistics-value for each of the statistical item defined in the statistics information table 53 are displayed.

Herein, the control section 17 and display section 12 constitute a statistics-value displaying means for displaying subpopulation statistics-value calculated by a subpopulation statistics-value calculating means. The statistics-value displaying means also allows displaying the subpopulation statistics values and population statistics-value in parallel for comparison.

The flow-line list is displayed in a flow-line list display section 90. In the flow-line list display section 90, there are displayed as a list flow-line IDs, store-entering times, store-exiting times, staying times, genders, and group customer IDs of the respective flow-line data stored in the subpopulation data file 42. The store-entering time is derived from a frame number of store-entering frame "1." The store-exiting time is derived from a frame number of store-exiting frame "n." The staying time is calculated from the entering time and exiting time. To each flow-line ID there is attached a check box 91.

When an item of the flow-line data (store-entering time, store-exiting time, staying times, genders, and group customer IDs, etc.) in the flow-line list display section 90 is selected (by clicking), the flow-line list lines of the applied items are sorted in ascending or descending order. For example, when item "store-entering time" is clicked, the flow-line list lines are sorted in the order of the earlier store-entering time from the top of the list. If "store-entering time" of the same item is successively clicked, the flow-line list lines are sorted in the order of the later store-entering time from the top of the list.

Herein, the control section 17 and display section 12 constitute a list display means for displaying a flow-line identification information list generated by the list generating means. The list display means allows displaying the flow-line identification information list sorted by any of the items as the sort key.

The flow-line list display section 90 is provided with a flow-line display button 92 and a report-generating button 93. These buttons 92, 93 are used in the next step ST12 of the analysis processing.

Figure 12:
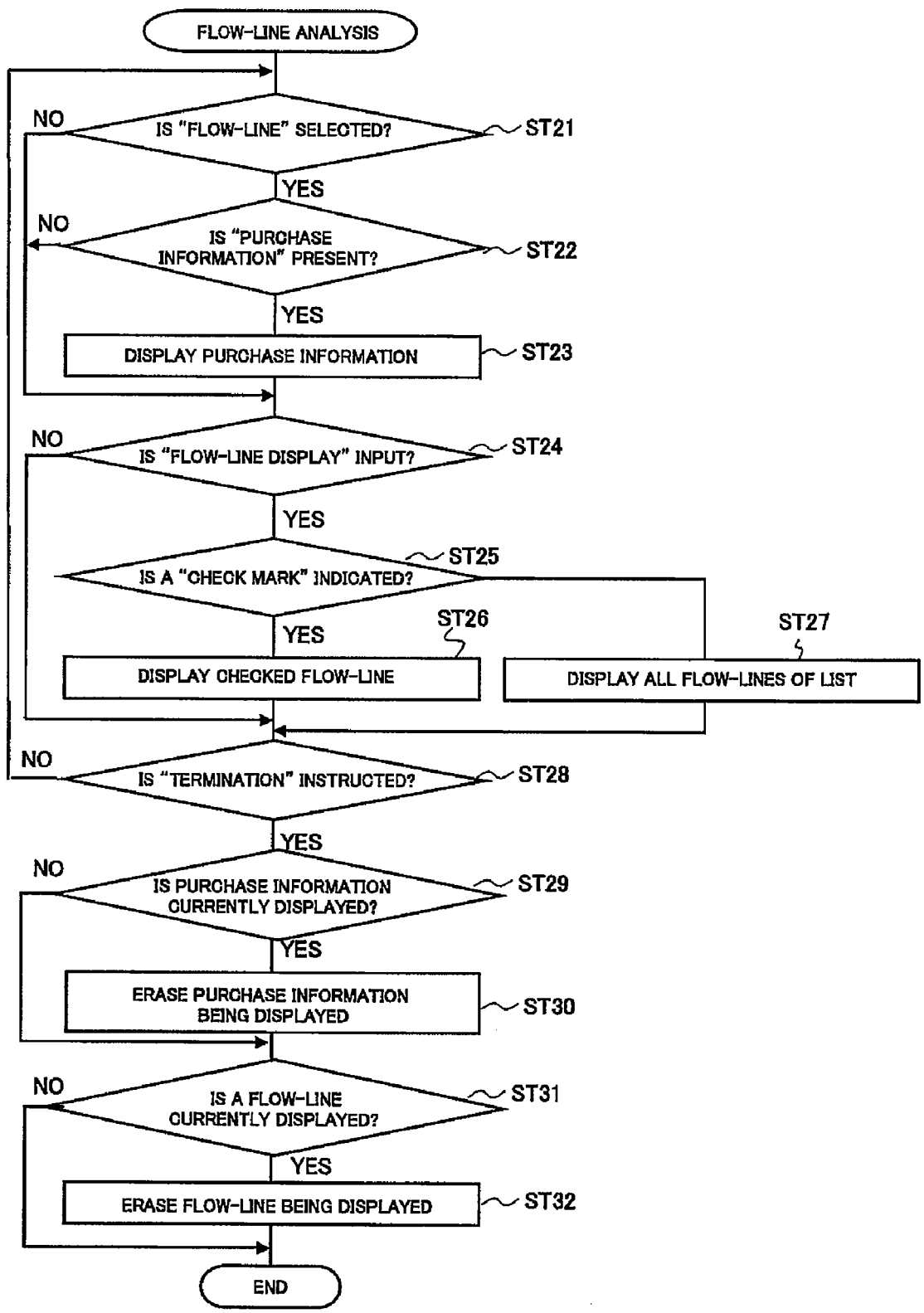
FIG. 12 is a flowchart specifically showing the processing procedure of flow-line analysis in FIG. 11.

That is, after the display section displays the statistics information and flow-line list, the control section 17 executes the analysis processing in step ST12. The analysis processing includes flow-line analysis processing and statistics-value analysis processing. First, the flow-line analysis processing will be described using a flowchart in FIG. 12.

The control section 17 waits for one of the flow-line data items being selected from the list instep ST21. For example, the operator applies a mouse onto an item of the flow-line data (flow-line IDs, store-entering time, store-exiting times, staying times, genders, and group customer IDs) as an analysis target and clicks on it. Then, the control section 17 acknowledges the selection of that data item. With the flow-line data item having being selected, the control section 17 determines whether purchase information correlated with that flow-line data exists in step ST22. That is, the control section 17 searches the flow-line/transaction link table 52 to determine that any transaction ID is correlated with the flow-line ID of the relative flow-line data. If so correlated, there exists purchase information correlated to that flow-line data. If not, there exists no purchase information correlated to that flow-line data.

If the purchase information exists, the control section 17 displays that purchase information on the display section 12. That is, the control section 17 accesses the POS server 22 to acquire transaction data specified by the transaction ID correlated to the flow-line ID from the purchase information database 24. The control section 17 generates a purchase information display section 100, for example, as shown in FIG. 16, based on this transaction data and displays it on the display section 12.

Herein, when arbitrary flow-line identification information is selected from the list displayed on the list display means, the control section 17 constitutes a purchase information acquisition means for acquiring purchase information correlated with the flow-line data specified by the flow-line identification information selected based on correlation information stored in the correlation information storage section (flow-line/transaction link table 52). The control section 17 and display section 12 constitute a purchase information display means for displaying the purchase information acquired by the purchase information acquisition means.

Figure 17:
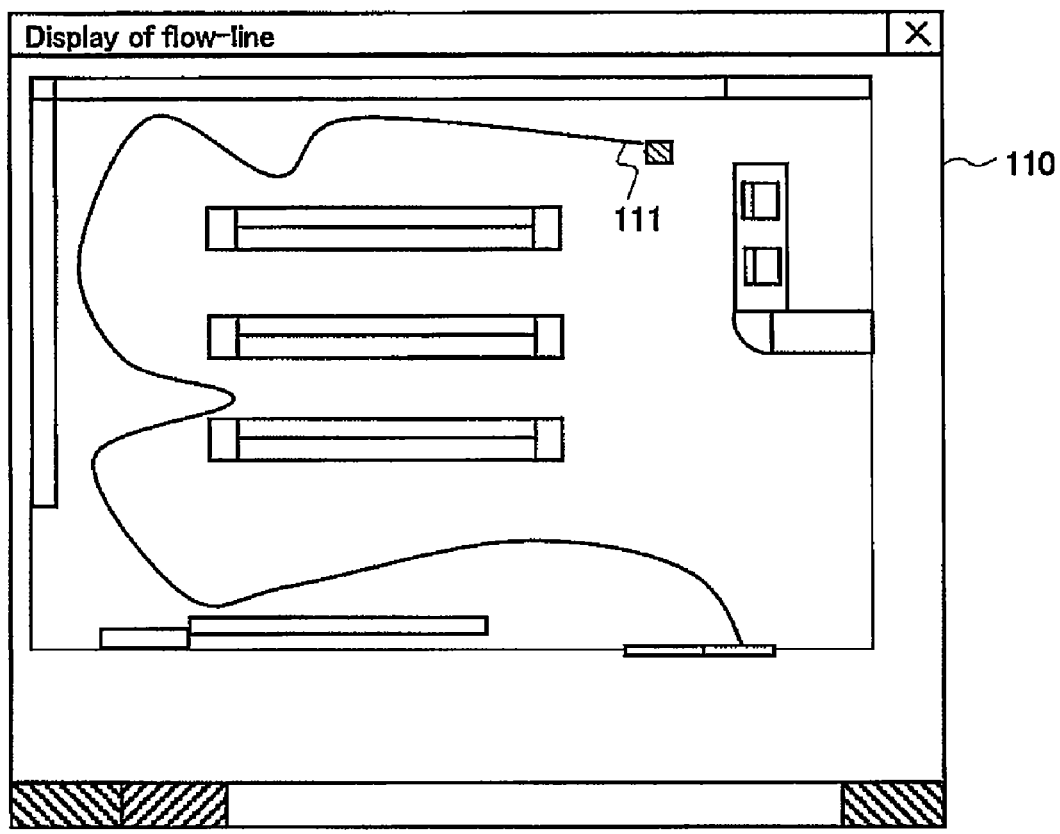
FIG. 17 is a plan view showing an example of a flow-line display section displayed in the display section of the personal behavior analysis apparatus according to the embodiment of the present invention.

In step ST24, the control section 17 waits for the flow-line display button 92 being pressed. With the flow-line display button 92 having been pressed, the control section 17 searches the check boxes 91 attached to the flow-line IDs in the flow-line list to see if a check mark is present in any box in step ST25. When at least one check box is checked, the control section 17 displays the flow-line specified by that checked flow-line ID in step ST26. If more than one flow-line ID are checked, all the relative flow-lines are displayed. That is, the control section 17 acquires flow-line data specified by the checked flow-line IDs from the subpopulation data file 42, and displays a flow-line based on the flow-line data in a layout flow-line display section 110, for example, as shown in FIG. 17 by sequentially interconnecting the respective coordinates within the store premise from store-entering coordinates to store-exiting coordinates.

If none of the check boxes is checked in the list, the control section 17 displays all the flow-lines specified by all the flow-line IDs in the flow-line list on the display section 12 in step ST27. That is, the control section 17 acquires all the flow-line data specified by the respective flow-line IDs from the subpopulation data file 42. The control section 17 displays a flow-line on the layout flow-line display section 110 based on the flow-line data, for example, by sequentially interconnecting the respective coordinates within store-premise from a store-entering coordinates to store-exiting coordinates.

Herein, the control section 17 and display section 12 constitute a flow-line display means for displaying the flow-line according to the flow-line data stored in the subpopulation storage section (subpopulation data file 42). The flow-line display means can display a flow line of flow-line data specified by flow-line identification information arbitrarily selected (checked in the check box) from the flow-line list. A flow-line 111 is not limited to a flow-line formed by connecting coordinates within the store-premise in the order of flame numbers, but may be represented by way of movement points presentation indicating the coordinates within the store-premise by points.

The control section 17 waits for the flow-line analysis processing to be terminated in step ST 28. For example, upon pressing a termination key of the input section 11, the control section 17 determines that termination of the flow-line analysis processing is instructed. In this case, the control section 17 determines whether the purchase information display section 100 is currently displayed in step ST29. If the purchase information display section 100 is displayed, the control section 17 erases the purchase information display section 100 from the screen in step ST30. Then, the control section 17 determines if the layout flow-line display section 110 is currently displayed in step ST31. If the layout flow-line display section 110 is displayed, the control section 17 clears the layout flow-line display section 110 from the screen in step ST32. The flow-line analysis processing ends at this point.

Figure 13:
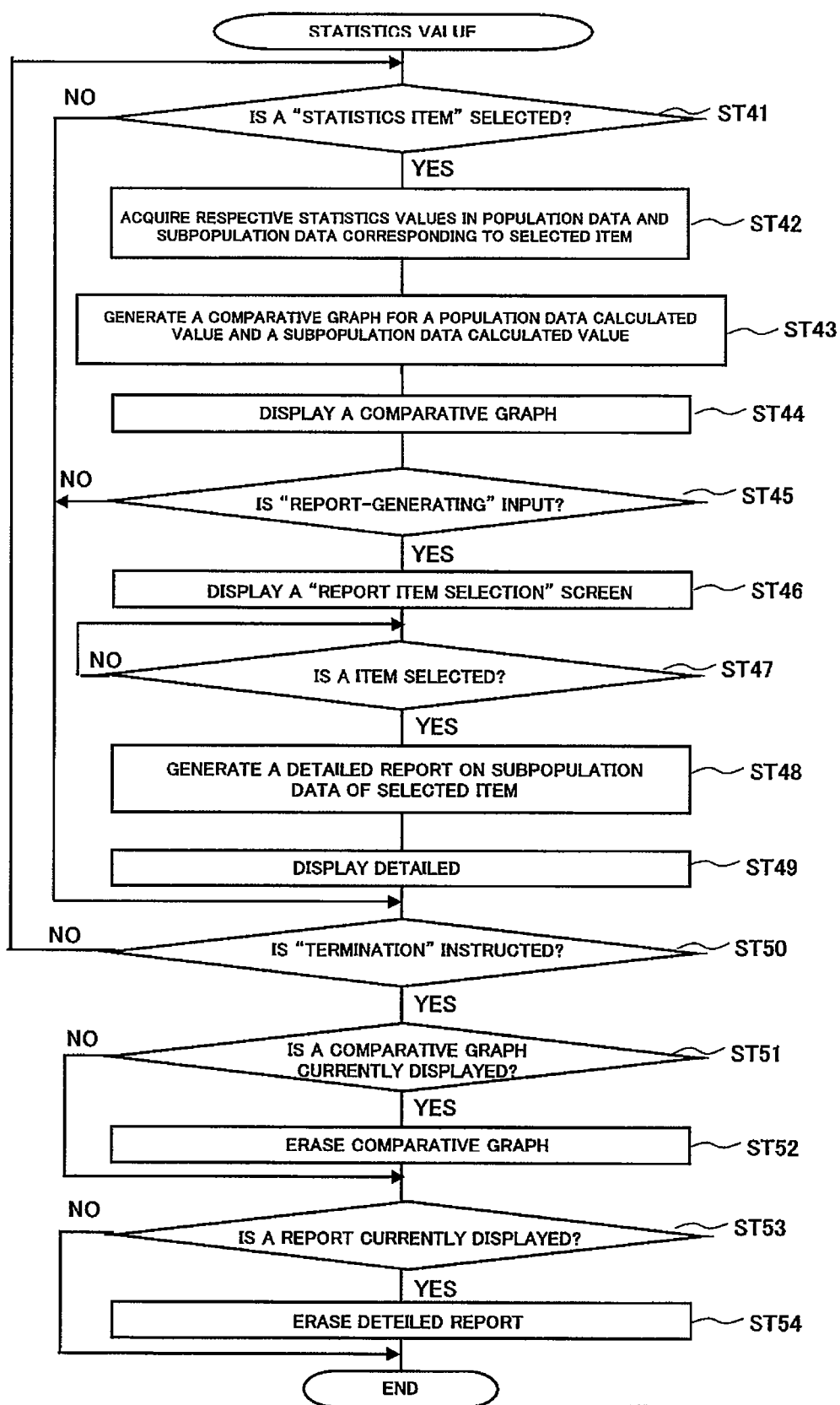
FIG. 13 is a flowchart specifically showing the processing procedure of statistics-value analysis in FIG. 11.

Now, the statistics-value analysis processing will be described in reference to the flowchart of FIG. 13. The control section 17 waits for any statistics item to be selected from the statistics information display section 80 in step ST41. For example, the operator applies a mouse pointer onto a statistics item name as an analysis object and clicks on it. Then, the control section 17 recognizes that that statistics item has been selected. Upon the statistics item having been selected, the control section 17 searches the statistics information table 53 to acquire the statistics-value of the population data and the statistics-value of the subpopulation data corresponding to that selected statistics item in step ST42.

Figure 18:
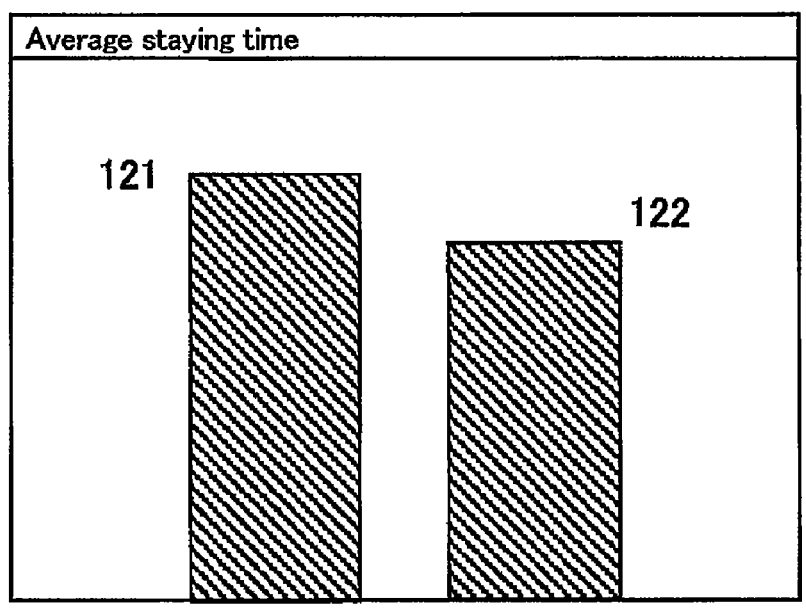
FIG. 18 is a plan view showing an example of a comparative graph displayed in the display section of the personal behavior analysis apparatus according to the embodiment of the present invention.

Next, the control section 17 generates in step ST43 a graph that allows comparison between the respective statistics values between the population data and the subpopulation data that have been acquired, and displays this comparative graph on the display section 12 in step ST44. FIG. 18 illustrates an example display of the comparative graph. The FIG. 18 is a comparative graph for "average staying time" as the statistics item in reference to FIG. 15. In FIG. 18, the left bar graph 121 represents the statistics-value of the subpopulation data while the right bar graph 122 represents the statistics-value of the population data. The form of such a graph need not be limited to a bar graph as long as a comparison between the statistics-value of the subpopulation data and the statistics-value of the population data is explicitly exhibited thereby.

Herein, the statistics-value display means allows comparative display of the subpopulation statistics-value calculated by the subpopulation statistics-value calculating means and the population statistics-value calculated by the population statistics-value calculating means by forming them in a graph.

After displaying the comparative graph, the control section 17 determines whether the report-generating button 93 is pressed in step ST45. Upon the entry of the report-generating button 93, the control section 17 displays a report item selection screen in step ST46. The report item selection screen selectively displays a list of statistics items that can be output as a report. When any one of the statistics items is selected in step ST47, the control section 17 generates a detailed report on the selected statistics item applying to the flow-line data stored in the subpopulation data file 42 in step ST48. For example, if "staying time" of the statistics item is selected, a report on distribution of the staying times, i.e., a histogram of the staying times in the subpopulation data. If "article name" of the statistics item is selected, a report in which names of articles that have been actually purchased and the number of the respective articles are graphed is output.

After generating such a report, the control section 17 displays this report on the display section 12 in step ST49.

Herein, the control section 17 constitutes a report generating means for generating a report as to the flow-line data stored in the subpopulation storage section (subpopulation data file 42). Also, the control section 17 and display section 12 constitute a report output means for outputting a report generated by the report generating means. The report output means is not limited to an output display. If a printer is connected to the personal behavior analysis apparatus 1, such a report may be output as a print.

The control section 17 waits for an instruction for terminating the statistics-value analysis processing in step ST50. For example, with a terminal key of the input section 11 operated, the control section 17 determines that the termination of the statistics-value analysis processing has been instructed. In this case, the control section 17 determined if any comparative graph is currently displayed on the display section 12 in step ST51. If such a comparative graph is displayed, then the control section 17 erases the display from the screen in step ST52. Also, the control section 17 determines whether any report is currently displayed in step ST53. If displayed, the control section 17 erases such a report. The statistics-value analysis processing terminates here.

Thus, in this embodiment, when the operator instructs initiation of the personal behavior analysis operation to the personal behavior analysis apparatus 1, all the flow-line data stored in the flow-line database 36 are collected and stored in the population data file 41 as a population. In addition, the condition input section 70 is displayed on the display section 12. Then, the operator inputs a condition that narrows down flow-line data as an analysis target.

The flow-line data is a collective of coordinate information for respective frame numbers created from the time a customer enters the monitored area until the customer exits the same area. The frame number is incremented each time when a frame image is shot by the respective cameras 31. That is, the frame number corresponds to a shooting time and thus the flow-line data contains time information.

The condition input section 70 allows inputting of condition data from the input panel 72 of tab "Time information" with respect to store-entering time, store-exiting time, transaction time, store-entering time zone, store-exiting time zone, staying time, etc. For example, if analysis of behaviors of customers who entered after 6 p.m. (condition 1) is wished, the operator inputs "store-entering time" in the search item input column 721 of the input panel 72, "1800" representative of 6 p.m. in the search value input column 722, and "greater than" for the supplemental condition in the additional condition input column 723.

Transaction data as purchase information is correlated with the flow-line data of a customer who purchased an article. That is, there is stored in the flow-line/transaction link table 52 a flow-line ID of the flow-line data and a transaction ID of the transaction data correlated with that flow-line data as both being interrelated.

On the other hand, the condition input section 70 allows inputting of condition data from the input panel 72 of tab "Purchase information" with respect to terminal number, transaction date/time, transaction serial number, sum total, total purchase points, customer base, article category code, articles shelf code, etc. For example, if analysis of behaviors of customers who bought article(s) of a total amount of 1000 yen or less (condition 2) is wished, the operator inputs "total amount" in the search item input column 721 of the input panel 72, a value of "1000" in the search value input column 722, and "equal to or less than" in the supplemental condition input column 723.

Furthermore, the coordinate information of the flow-line data indicates a position where the relative customer stood at a relevant shooting time corresponding to a given frame number. That is, the flow-line data contains position information.

The condition input section 70 allows inputting of condition data from the input panel 72 of tab "Area information" with respect to entrance/exit, cashier, passage, magazine corner, beverage corner, lunchbox corner, magazine-corner staying ratio, beverage-corner staying ratio, lunchbox-corner staying ratio, etc. For example, if analysis of behaviors of customers having a magazine-corner staying ratio of 70% or higher (condition 3) is wished, the operator inputs "magazine-corner staying ratio" in the search item input column 721 of the input panel 72, a value "70" in the search value input column 722, and "greater than" in the supplemental condition input column 723.

When the operator presses the search start button 728 after inputting the above conditions 1 to 3, applicable flow-line data that meets all the above conditions 1 to 3 are extracted from the flow-line data stored in the population data file 41. The extracted flow-line data is stored in the subpopulation data file 42 as subpopulation data. That is, the flow-line data of customers who entered the store after 6:00 p.m., purchased commodities for a total (purchase) amount of 1000 yen or less, and have a magazine-corner staying ratio of 70% or higher is stored in the subpopulation data file 42.

Thereafter, the personal behavior analysis apparatus 1 calculates a subpopulation statistics-value and a population statistics-value for each of the statistics items set in the statistics information table 53. The subpopulation statistics-value is calculated using all the flow-line data stored in the subpopulation data file 42. The population statistics-value is calculated using all the flow-line data stored in the population data file 41.

For example, in the case that the statistics item is "sum total of flow-lines," the number of flow-line data are counted within the data stored in each of the subpopulation data file 42 and population data file 41 are counted, and the counts are acquired as the corresponding subpopulation statistics-value and population statistics-value, respectively. In the case that the statistics item is "minimum staying time," staying times are compared to each other within the flow-line data stored in the respective subpopulation data file 42 and population data file 41, and a minimum time within each of the files is acquired as the corresponding subpopulation statistics-value and population statistics-value, respectively. Similarly, in the case that the statistics item is "maximum staying time," staying times are compared to each other within the flow-line data stored in the respective subpopulation data file 42 and population data file 41, and a maximum time in each file is acquired as the corresponding subpopulation statistics-value and population statistics-value, respectively. Furthermore, in the case that the statistics item is "average staying time," an average staying time in the flow-line data stored within each of the subpopulation data file 42 and population data file 41 is acquired as the respective corresponding subpopulation statistics-value and population statistics-value. Thus, the respective statistics values are stored in the statistics information table 53 and displayed in the statistics information display section 80 of the display section 12.

Then, the personal behavior analysis apparatus 1 generates a flow-line list from each of the flow-line data stored in the subpopulation data file 42. The generated flow-line list is displayed in the flow-line list display section 90 of the display section 12.

Thus, the operator can statistically analyze customer behaviors that are narrowed down with a condition or conditions from the subpopulation statistics values in the statistics information display section 80. For example, an analysis can be made such that, referring to the display example of FIG. 15, the number of customers that is narrowed down by the input conditions is 108; the average staying time is a time corresponding to 265.81 frames; the minimum staying time is a time corresponding to 57 frames; and the maximum staying time is a time corresponding to 1073 frames.

The statistics information display section 80 displays population statistics values compared to subpopulation statistics values. This allows the operator to analyze behaviors of customers that are narrowed down according to the input conditions in contrast to the behaviors of the entire customers.

By applying a mouse pointer to any one of the statistics item names in the statistics information display section 80 and clicking on the item, a comparative graph of the subpopulation statistics values and the population statistics values relating to the corresponding statistics item is displayed on the display section 12. Therefore, the operator can also visually analyze the behaviors of customers that are narrowed down according to the input conditions in contrast with the behaviors of the entire customers.

With the flow-line display button 92 pressed, a flow-line corresponding to each of the flow-line data stored in the subpopulation data file 42 is displayed on a layout flow-line display section 110. At this time, if a check box of the flow-line list is checked, only the flow-line relative to flow-line data of the flow-line ID being checked is displayed.

By applying a mouse pointer to any one of the flow-line IDs, etc. in the statistics list and clicking on it, if purchase information is correlated to that flow-line ID, that purchase information is displayed on the display section 12. This facilitates operations of confirming and analyzing purchase information of a particular customer while individually tracking that customer's behavior narrowed down by an input condition.

The description was made in the above embodiment that the personal behavior analysis program that fulfils the functions of the present invention is previously stored in the program storage section 14 within the apparatus. Alternatively, however, the like functions may be down loaded from a network to the apparatus, or a recording medium storing the like functions may be installed in the apparatus. Such a recording medium may be of any type, such as a CD-ROM, as long as it can store a program and be read by the apparatus. Such functions as attained by pre-installing or downloading can be realized by cooperating with the operating system (OS) within the apparatus.

By implementing the above means, the present invention can provide a personal behavior analysis apparatus capable of statistically analyzing personal behaviors. The invention can also provide a method of analyzing personal behaviors using the personal behavior analysis program that enables a computer to function as a personal behavior analysis apparatus.

Various inventions can be made by appropriately combining the plurality of the components that have been disclosed in the above embodiment. For example, some components may be removed from the total components disclosed in the above, or a component or components incorporated in a different embodiment may be combined with the existing components.

The present invention has been described with respect to specific embodiments. However, other embodiments based on the principles of the present invention should be obvious to those of ordinary skill in the art. Such embodiments are intended to be covered by the claims.

What is claimed is:

1. A personal behavior analysis apparatus comprising:
    a population storage section storing individual flow-line data as a population, each of the individual flow-line data being acquired by tracking the behavior of each person within a monitored area;
    a condition input section accepting input of a condition for narrowing down the flow-line data as analysis objects from the data stored as a population in the population storage section;
    searching means for searching the population storage section according to the condition input through the condition input section to acquire flow-line data meeting the condition;
    a subpopulation storage section storing the flow-line data acquired by the searching means as a subpopulation;
    a subpopulation statistics-value calculator for calculating a statistics-value relating to personal behavior analysis using the flow-line data stored in the subpopulation storage section; and
    a statistics-value display for displaying the subpopulation statistics-value calculated by the subpopulation statistics-value calculator.

2. The personal behavior analysis apparatus according to claim 1, further comprising a flow-line display for displaying a flow-line according to the flow-line data stored in the subpopulation storage section.

3. The personal behavior analysis apparatus according to claim 2, further comprising list generating means for generating a flow-line identification information list for individually identifying each flow-line data stored in the subpopulation storage section and a list display for displaying a flow-line identification information list generated by list generating means, wherein the flow-line display displays the flow line of flow-line data specified by flow-line identification information arbitrarily selected from the flow-line identification information list.

4. The personal behavior analysis apparatus according to claim 3, wherein the list display displays the flow-line identification information list sorted with any of list items as a sort key.

5. The personal behavior analysis apparatus according to claim 3, further comprising:
    a correlating information storage section storing correlation information correlating purchase information of each customer with the flow-line data of the relevant customer;
    purchase information acquisition means for acquiring purchase information that is correlated with flow-line data specified by selected flow-line identification information based on the correlation information stored in the correlation information storage section, after arbitrary flow-line identification information is selected from the list displayed on the list display; and
    a purchase information display that displays the purchase information acquired by the purchase information acquisition means.

6. The personal behavior analysis apparatus according to claim 1, wherein the statistics-value display further displays population statistics-value calculated by a population statistics-value calculator in parallel for comparison.

7. The personal behavior analysis apparatus according to claim 6, wherein the statistics-value display comparatively displays the subpopulation statistics-value calculated by the subpopulation statistics-value calculator and the population statistics-value calculated by the population statistics-value calculator by a graph created with the respective statistics-values.

8. The personal behavior analysis apparatus according to claim 1, wherein the flow-line data contains time information created from the time when a customer enters the monitored area until the customer exits the monitored area, and the condition input section is enabled to accept input of a conditional item pertaining to the time.

9. The personal behavior analysis apparatus according to claim 1, further comprising an area division information storage section storing area division information for dividing the monitored area into multiple plots, wherein the flow-line data contains position information created from the time when a customer enters the monitored area until the customer exits the monitored area, and the condition input section is enabled to accept input of a conditional item pertaining to the plot.

10. The personal behavior analysis apparatus according to claim 1, further comprising a correlating information storage section storing correlation information correlating purchase information of each customer within the monitored area with the flow-line data of the relevant customer, wherein the condition input section is enabled to accept input of a conditional item pertaining to the purchase information.

11. The personal behavior analysis apparatus according to claim 1, further comprising:
    report generating means for generating a report as to the flow-line data stored in the subpopulation storage section; and
    report output means for outputting the report generated by the report generating means.

12. A computer-readable recording medium installing a personal behavior program executed by a computer having an input section, a display section, and a storage section, the program being configured to enable the computer to perform:
    a population storage function of storing individual flow-line data as a population in the storage section, each of the individual flow-line data acquired by tracking the behavior of each person within a monitored area;
    a condition input function of accepting input of a condition for narrowing down the flow-line data as analysis objects from the data as the population stored in the storage section;
    a searching function of searching the data as the population stored in the storage section according to the condition input through the input section to acquire flow-line data meeting the condition;
    a subpopulation storage function of storing the flow-line data acquired by the searching function as a subpopulation;
    a subpopulation statistics-value computing function of computing a statistics-value relating to the personal behavior analysis using the flow-line data stored as the subpopulation in the storage section; and
    a statistics-value display function of displaying on the display section the subpopulation statistics-value computed by the subpopulation statistics-value computing function.

13. The recording medium according to claim 12, the program enabling the computer to further perform:
    a flow-line display function of displaying a flow-line of the flow-line data stored as the subpopulation in the storage section.

14. The recording medium according to claim 12, the program enabling the computer to further perform:
a list generating function of generating a flow-line identification information list for identifying each flow-line data stored as the subpopulation in the storage section; and
a list display function of displaying the flow-line identification information list generated by the list generating function.

* * * * *